(No Model.)
R. SCHEIDLER.
WHEEL.
No. 335,964. Patented Feb. 9, 1886.
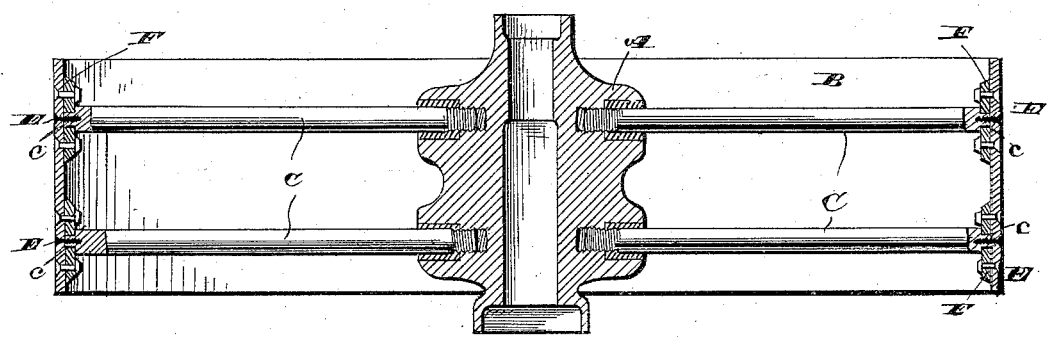
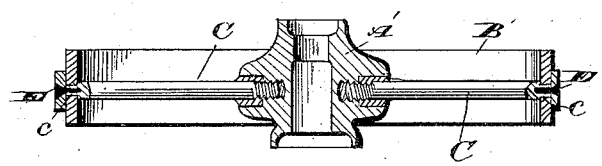
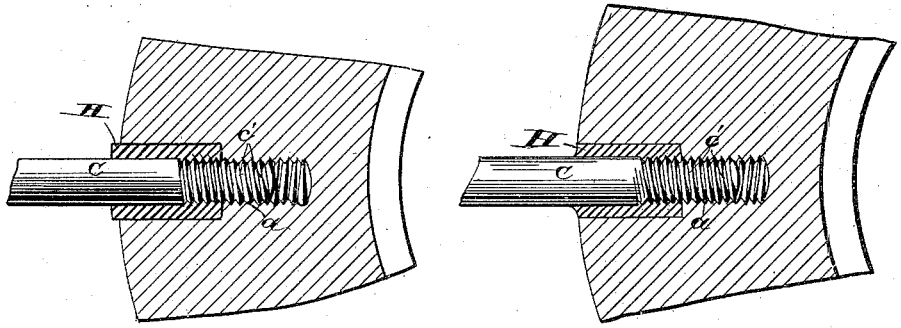
WITNESSES
Wm M. Monroe.
Geo. W. King
INVENTOR
Rheinhard Scheidler
by Daggett and Daggett
Attorneys

UNITED STATES PATENT OFFICE.

REINHARD SCHEIDLER, OF NEWARK, OHIO.

WHEEL.

SPECIFICATION forming part of Letters Patent No. 335,964, dated February 9, 1886.

Application filed October 13, 1885. Serial No. 179,794. (No model.)

*To all whom it may concern:*

Be it known that I, REINHARD SCHEIDLER, of Newark, in the county of Licking and State of Ohio, have invented certain new and useful Improvements in Metal Wheels; and I do hereby declare the following to be a full, clear, and exact description of the invention, such as will enable others skilled in the art to which it pertains to make and use the same.

My invention relates to improvements in metal wheels designed more especially for portable and traction engines; and it consists in certain features of construction, and in combination of parts hereinafter described, and pointed out in the claims.

In the accompanying drawings, Figures 1 and 2 are plan views in section through the center of the respective wheels, the one showing a large broad wheel with two sets of spokes, the other a smaller wheel with one set of spokes, but both wheels embodying my invention. Figs. 3 and 4 are enlarged details illustrating the manner of securing the spokes in the hub.

A and A′ represent the respective hubs of the wheels; B and B′ the respective tires, and C the spokes. The spokes are of metal tubing with plugs welded in the outer ends. These plugs project a short distance, forming round tenons $c$.

With small wheels, such as shown in Fig. 2, that are used for carrying-wheels, guiding-wheels, &c., and are usually located under the forward part of the engine, the tenons $c$ extend through the tire. These wheels have, respectively, bands D outside the tire to hold the wheels from sliding laterally—for instance, on steep hillsides. The band D is placed over the tenon $c$, and screws E pass through the band and screw into threaded holes in the ends of the tenons. The screws E have countersunk heads that come flush with the face of the band. The bands D are made narrow, so that they will cut into the ground, and are liable to break in running over stones, &c., unless made heavier than is desirable. In case of breakage, the bands are securely held in place by the screws E.

With the large traction-wheel the spokes, when set as near together circumferentially in the hub as is practicable, are of such distance apart at the tire that the latter, unless of extra thickness, requires stiffening, and for this purpose the plates F are employed. The tenons $c$ pass through the respective plates F, but do not enter the tire. The plates are bolted to the tire, as shown, and the screws E pass through, and the heads are countersunk in the tire.

The plates F on larger wheels are usually of considerable size to stiffen the tire, as aforesaid, and without the screws E there is likely to be some vibration in these plates that would wear the bolts that secure these plates, and also wear the plates, tire, and tenons. The screws E prevent any such vibration, and greatly increase the durability of this part of the device. The holes in the hub for receiving the spokes are at the outer end somewhat larger than the spokes, as shown more clearly in Figs. 2 and 3. The bottom portion of the holes are threaded at $a$, to receive the threaded portion $c'$ of the spokes.

In assembling the parts the spokes are screwed in far enough to allow the tire to be placed in position, after which the spokes are backed out to strain the tire and bring the latter concentric with the hub. The hub is then heated moderately to expand the same, and while in this heated condition soft metal is run into the outer portion of the holes, forming packing H around the spokes. The packing is made to project beyond the periphery of the hub, as shown in Fig. 3, and is afterward calked down, as shown in Fig. 4. The packing supports the spokes above the threaded portion, so that the full strength of the spoke is had.

Heretofore tubular spokes have been supported in the hub outside of the threaded portion of the spokes, but the construction was such that the spokes required turning and the holes boring, so that the parts would fit nicely, and that was expensive.

With my improved method for supporting the spokes by means of metal packing the holes in the hub are cored, the outer portion of each hole being considerably larger than the spoke, and the tubular spoke is left in the rough, no labor being expended on this end of the spoke except the cutting of the thread.

These wheels are well adapted not only to traction-engines and portable engines generally, but may be used for a variety of other purposes. Consequently I claim them for all purposes for which they are adapted.

What I claim is—

1. In a metal wheel, the combination, with spokes having tenons on the outer end for supporting the rim of the wheel, and screws arranged to extend through the rim of the wheel and screwing into threaded holes in the end of said tenons, and arranged substantially as described, whereby the rim and spokes are drawn and held together by the draft of said screws, of the hub having spoke-mortises, and a filling introduced with said mortises around the spokes, substantially as set forth.

2. In a metal wheel, the combination, with spokes screwed into the hub, the holes in said hub near the periphery being larger than the spokes, of filling introduced into said holes around the spokes and arranged substantially as described, whereby the spokes are supported outside of the threaded part thereof.

In testimony whereof I sign this specification, in the presence of two witnesses, this 29th day of September, 1885.

REINHARD SCHEIDLER.

Witnesses:
WM. E. MILLER,
EDWARD KIBLER.